United States Patent
Zotti et al.

(10) Patent No.: US 10,124,968 B2
(45) Date of Patent: Nov. 13, 2018

(54) SIMPLIFIED SUBMERGED CHAIN CONVEYOR FOR BOTTOM ASH CONVERSIONS

(71) Applicant: The Babcock & Wilcox Company, Barberton, OH (US)

(72) Inventors: Loius A Zotti, King of Prussia, PA (US); Randy Jay Reynolds, Louisville, KY (US); Manfred Reinsch, Wilhelmshaven (DE); Karl Josef Zeitler, Ergoldsbach (DE); Austin Tyler Little, Chillicothe, OH (US)

(73) Assignees: THE BABCOCK & WILCOX COMPANY, Barberton, OH (US); BABCOCK & WILCOX LOIBL GMBH, Straubing (DE)

( * ) Notice: Subject to any disclaimer, the term of this patent is extended or adjusted under 35 U.S.C. 154(b) by 0 days.

(21) Appl. No.: 15/490,240

(22) Filed: Apr. 18, 2017

(65) Prior Publication Data

US 2017/0313527 A1    Nov. 2, 2017

Related U.S. Application Data

(60) Provisional application No. 62/329,504, filed on Apr. 29, 2016.

(51) Int. Cl.
*B65G 19/14* (2006.01)
*B65G 69/20* (2006.01)
(Continued)

(52) U.S. Cl.
CPC .............. *B65G 69/20* (2013.01); *B65G 19/14* (2013.01); *B65G 65/42* (2013.01); *F23J 1/02* (2013.01);
(Continued)

(58) Field of Classification Search
CPC .............. B01D 21/245; B01D 21/2455; B01D 21/2461; B65G 69/20; B65G 19/14; B65G 65/42
(Continued)

(56) References Cited

U.S. PATENT DOCUMENTS 1,355,180 A * 10/1920 Starkey ................ B65G 17/126
                                                                198/540
2,130,492 A *  9/1938 Hapman ................ B65G 19/14
                                                                110/101 R
(Continued)

*Primary Examiner* — James R Bidwell
(74) *Attorney, Agent, or Firm* — Michael J. Seymour

(57) ABSTRACT

A simplified submerged chain conveyor system for handling ash produced by large-scale coal fired boilers. The system incorporates an endless chain conveyor system moving a coal/ash aqueous mixture within a conveyor segment having a hydraulically closed duct. The system is adapted for retrofit applications of existing coal-fired boiler installations. In each embodiment the chain conveyor elevates the aqueous ash solution to dewater the ash. In several embodiments the boiler ash hopper is partially flooded with water and the system moves the ash mixture through a water column to the dewatering section. In one embodiment the ash mixture is not submersed but is subjected to water sprays before reaching the dewatering section. Great flexibility is provided in locating and positioning the conveyor system. One unit may be implemented to provide ash handling for multiple boilers. Embodiments are described operable in continuous or batch mode processes.

15 Claims, 11 Drawing Sheets

(51) Int. Cl.
  *B65G 65/42*    (2006.01)
  *F23J 1/02*    (2006.01)
(52) U.S. Cl.
  CPC .................. *F23J 2700/001* (2013.01); *F23J 2900/01003* (2013.01); *F23J 2900/01004* (2013.01)
(58) Field of Classification Search
  USPC .................................. 210/298; 198/716–734
  See application file for complete search history.

(56) References Cited

U.S. PATENT DOCUMENTS

| | | | | | |
|---|---|---|---|---|---|
| 2,245,073 | A | * | 6/1941 | Hapman | B65G 19/16 198/716 |
| 3,282,405 | A | * | 11/1966 | Wallace | B65G 19/14 198/716 |
| 3,587,834 | A | * | 6/1971 | Dugge et al. | B65G 65/42 198/312 |
| 4,394,980 | A | * | 7/1983 | Marz | B01F 15/0201 241/46.02 |
| 4,587,022 | A | * | 5/1986 | Shimizu | B01J 2/30 210/710 |
| 5,964,566 | A | * | 10/1999 | Stewart | B65G 67/24 198/302 |
| 6,015,498 | A | * | 1/2000 | Gleizes | B01D 15/00 134/7 |
| 8,960,412 | B1 | * | 2/2015 | Maxwell | B65G 37/00 198/531 |

\* cited by examiner

SIMPLIFIED SUBMERGED CHAIN CONVEYOR FOR BOTTOM ASH CONVERSIONS

FIELD OF THE INVENTION

This invention relates to a system for handling ash, and particularly to a simplified submerged chain conveyor system called a submerged grind conveyor ("SGC") for removing bottom ash from large-scale coal fired boilers.

BACKGROUND OF THE INVENTION

The following description of general background of the present invention makes reference to the appended drawing FIGS. 1 through 4 which show prior art systems. The combustion process of coal in power utility fired boilers produces two types of waste products; 1) ash particles that are small enough to be entrained in the flue gas referred to as fly ash, and 2) relatively large ash particles that overcome drag in the combustion gases and drop to the bottom of the boiler referred to as bottom ash. Typically, bottom ash is either collected in a water impoundment or in a dry bottom. Water impounded ash, referred to as wet bottom ash, is typically collected in individual water filled hoppers, as shown in FIG. 1 which illustrates a typical bottom ash-to-pond system 10, or in a closed loop recirculation system 26 shown in FIG. 2, or in a water filled trough with a submerged drag chain system 12 as shown in FIG. 3. In the system of FIG. 1, ash is discharged each shift in a batch process from hoppers 14 through bottom gate 16 on the side of the hoppers 14. Ash grinders 18 are provided to reduce ash particle size to less than about 3 in. (typically) to allow conveyance in a pipe as an ash/water slurry. The slurry is discharged into a storage pond 20 where the ash settles out over time. Surge tank 30 is provided to handle transient surges in the slurry flow. Numerous pumps 22 and valves 24 are provided for moving the slurry through system 10 (these elements are also shown in FIGS. 2, 3 and 4).

Closed loop recirculation system 26 shown in FIG. 2 is a modified form of system 10 and provides closed loop dewatering system and uses a settlement unit referred to by applicant as a "Hydrobin®" unit 28 as shown in FIG. 2. In the system 26 shown in FIG. 2, bottom ash 11 is discharged from hoppers 14 into the grinder 18 and is then pumped as an ash-water slurry to remotely located Hydrobin® dewatering bins 28 which provide a two-stage settling process necessary to clarify the water enough for recycling. Settled ash is drained of water through screens in the dewatering bins 28. Surge tank 30 and settling tank 32 handle the drained water and provide further clarification and separation of coal ash from the water. Clarified water is recycled back to convey the next batch of ash slurry. Dewatered ash slurry is hauled away from the plant site.

Systems and 10 and 26 are so-called wet sluicing systems which operate successfully but have a number of drawbacks, principally requiring large amounts of transport water that requires sophisticated treatment as well as significant capital expenditures.

The submerged mechanical drag conveyor system 12 (or submerged chain conveyor or "SCC") is illustrated in FIGS. 3 and 4, and is typically applied to provide continuous ash removal. Bottom ash continuously falls into the SCC 12 through hopper discharge 42 and settles onto a chain-and-flight conveyor system referred to as a submerged drag chain unit 34. Unit 12 forms an open trough which is filled with water to quench the dry ash as it falls into the unit from the boiler. The chain of unit 34 moves continuously and carries away ash which is dewatered as it moves along an inclined section 36 and is transported via a conveyor 44 and into a bottom ash silo 38, and is later discharged into a truck to transport the material off-site. Make-up water is added to offset water loss with wet ash being removed from the system and due to evaporation. Mill reject hoppers 40 are provided to process such material which is directed onto chain conveyor inclined section 36 for processing along with the bottom ash slurry stream. The submerged drag chain conveyor unit 34 is positioned directly beneath the boiler ash hopper discharge 42. The boiler throat being rectangular shaped requires the orientation of the submerged drag chain conveyor unit 34 and boiler ash hopper discharge 42 to be substantially parallel to the major axis of the boiler throat. Another view of submerged drag chain conveyor unit 12 is shown in FIG. 4 which further illustrates the conveyor drive unit 46 and take-up unit 48 which provide proper conveyor chain tensioning. In this prior art system, one of the units 12 shown in FIGS. 3 and 4 is provided for each boiler ash hopper discharge 42.

The handling of ash from large-scale coal burning boilers is subject to ever increasingly stringent governmental regulations, including the US EPA's federal ELG (Effluent Limitations Guidelines) rules. These rules treat different forms of water streams found in bottom ash handling systems in different ways. For example, these rules preclude the discharge into the environment of ash transport water such as used in the pond system 10 shown in FIG. 1 and in the closed loop hydraulic system 26 shown in FIG. 2, and ash basins. Water streams not subject to these ELG requirements (presently) include quench water used in submerged chain conveyor systems 12 and other minor discharges. Retrofitting existing coal-fired boilers to modern ash handling system frequently involves a considerable capital expense. Operators of these systems will often decommission boilers in view of the significant expenses associated with retrofits.

With the above considerations in mind, boiler operators are often faced with difficult decisions regarding continuing the lifetime of existing installations. Installation of a conventional submerged drag chain system 12 as illustrated in FIG. 3 ordinarily requires removal of existing bottom ash hoppers 14 and replaced with a rectangular shape trough hopper 42 that can accept a continuous flow of ash. As mentioned previously, make-up water must be added to offset water loss. The water temperature is relatively high in these systems and therefore a cooling system is provided, such as through recirculation to a pond or installation of heat exchangers. Existing SCC systems 12 provide the benefits of not requiring transport water and the equipment cost is relatively low. In addition, maintenance and operating costs are relatively low as compared with wet sluicing systems. However, significant disadvantages are associated with the major reworking of the boiler mentioned above and the significant space requirements of such systems including orientation constraints. Since the system 12 is situated directly beneath the boiler without any isolation valves, a break in the SCC chain or other maintenance issue may require boiler shutdown in order to repair the fault.

This invention is related to embodiments of simplified submerged chain conveyor systems which are adaptable for retrofit applications which avoid the disadvantages mentioned previously. Several embodiments of the invention are illustrated and described herein.

DETAILED DESCRIPTION OF THE INVENTION

Figure 1:
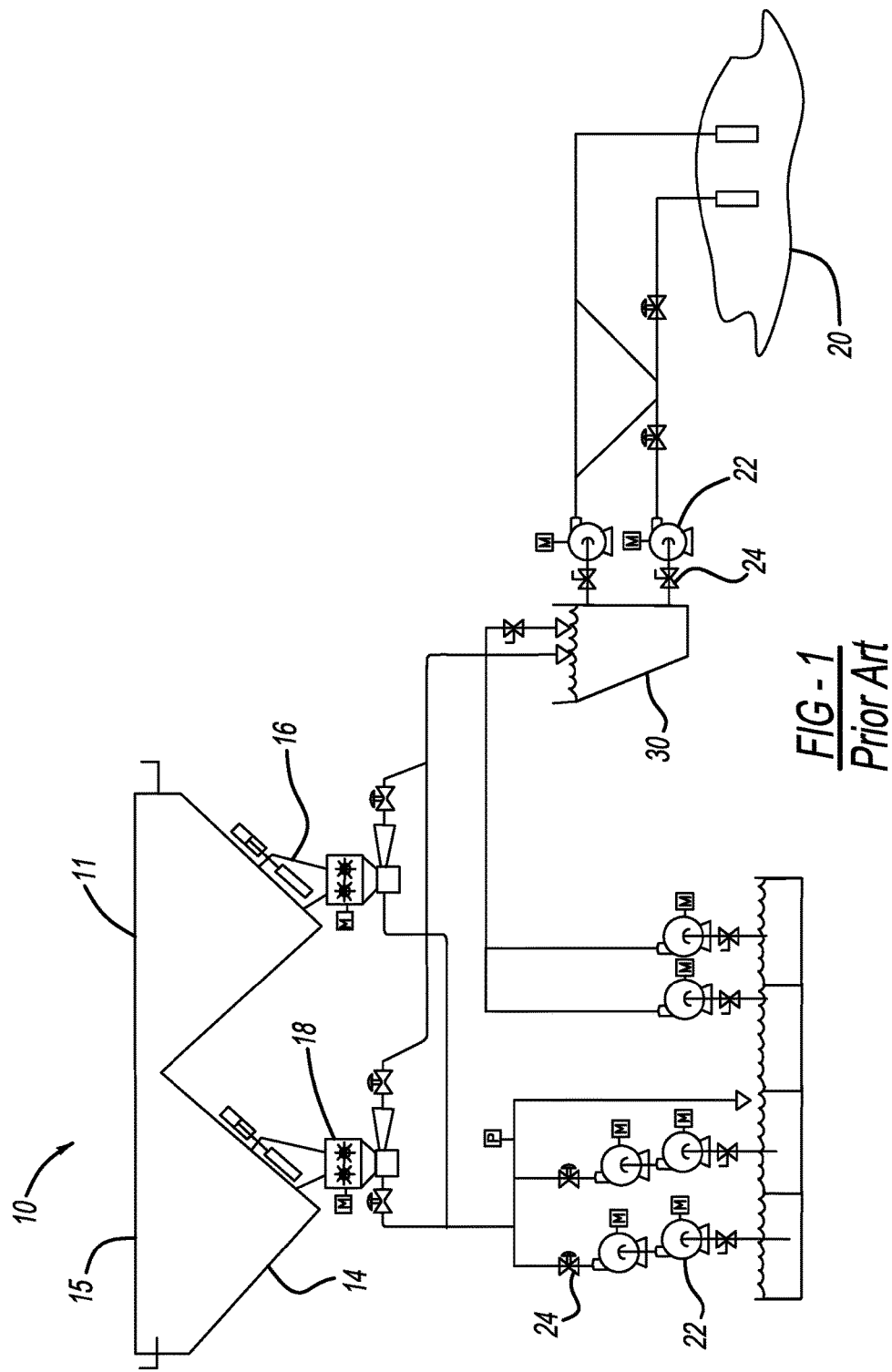
FIG. 1 illustrates a typical bottom ash-to-pond ash handling system in accordance with the prior art.
Figure 2:
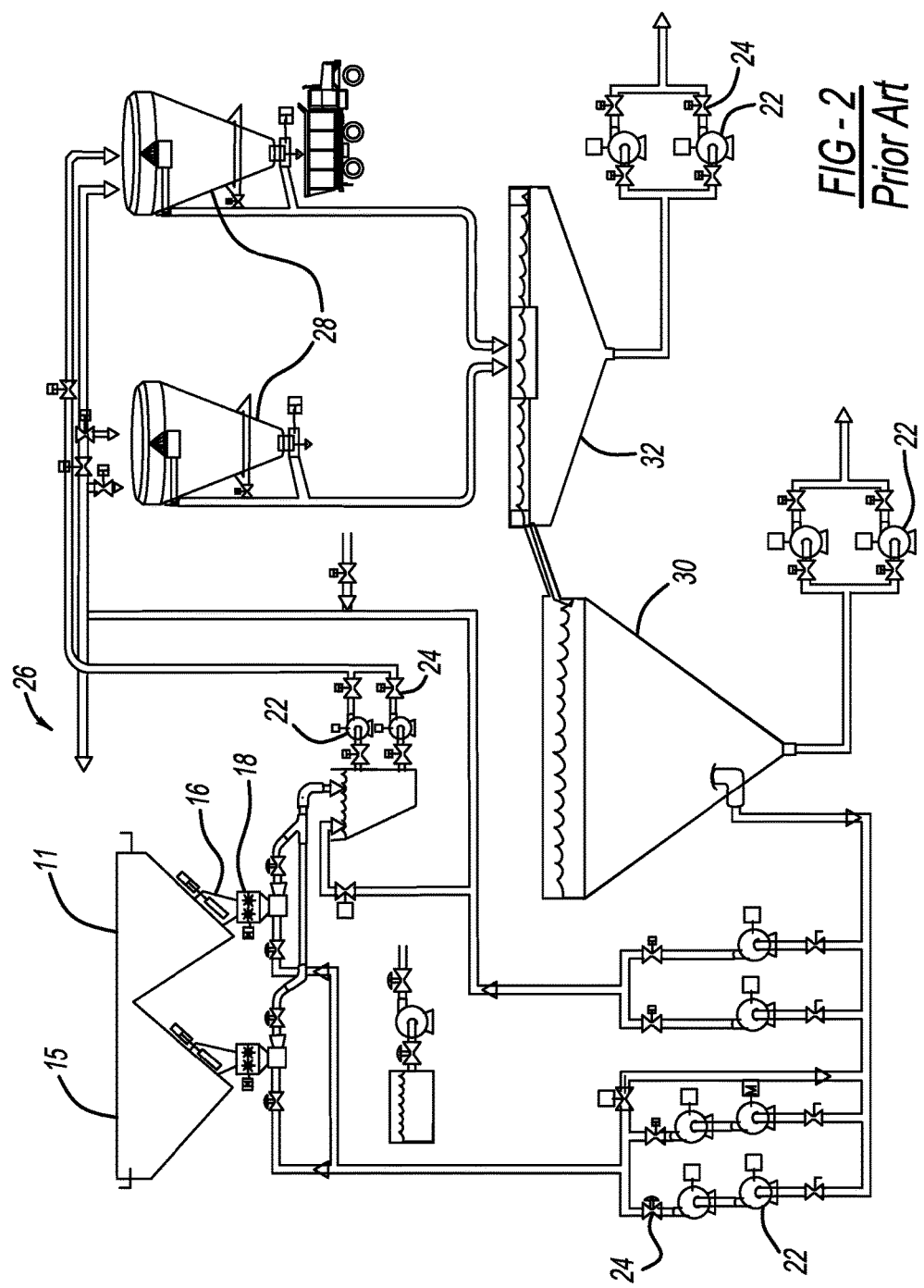
FIG. 2 illustrates a typical closed loop recirculation system for ash slurry handling in accordance with the prior art.
Figure 3:
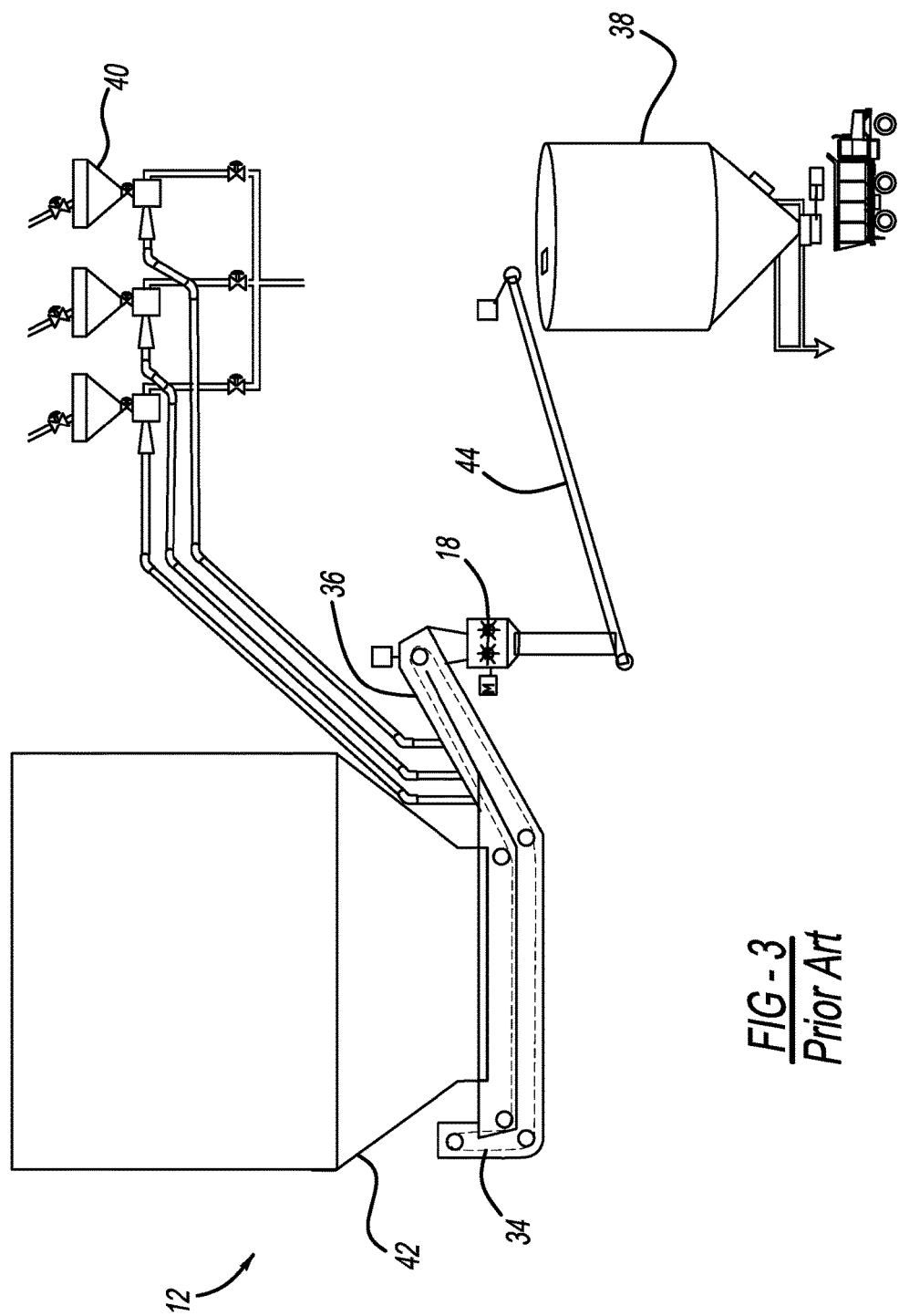
FIGS. 3 and 4 illustrate a typical bottom ash submerged drag chain conveyor system in accordance with the prior art.
Figure 4:
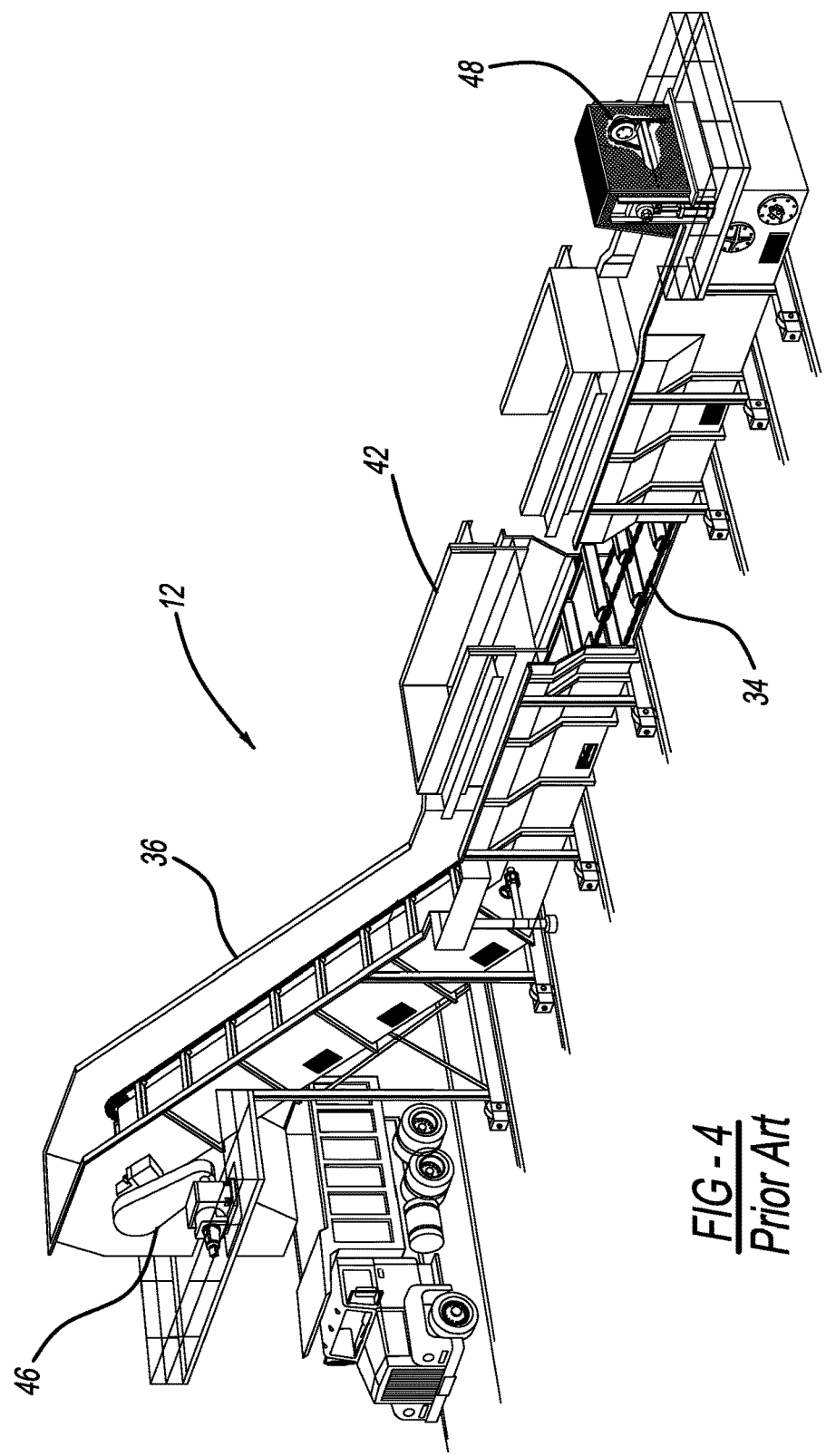
Figure 5:
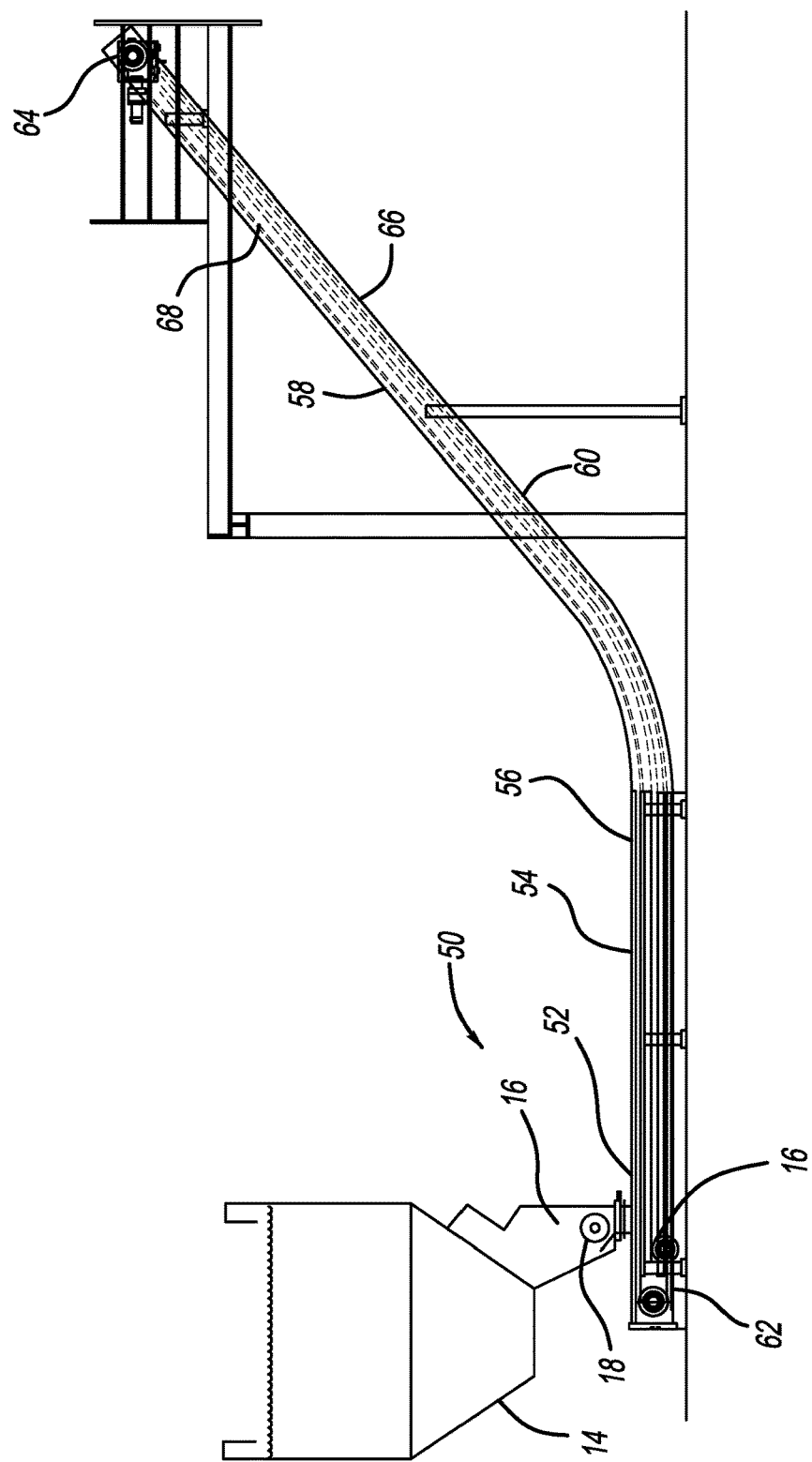
FIG. 5 illustrates a SGC in accordance with the present invention.

Now with reference to FIGS. 5 through 10, embodiments of the present invention will be described. FIG. 5 represents the basic configuration of the SGC in accordance with the present invention, generally designated by reference number 50. In describing SGC 50 certain components are common with the prior art systems described previously, and the same reference numbers are used to designate them. SGC 50 includes receiving section 52 directly connected with the existing ash hopper 14. Bottom gate 16 can be opened or closed to connect or isolate ash hopper 14 from receiving section 52. Clinker grinder 18 is provided for the purposes of reducing particle size to less than about 2 inch (typically) to fit in a smaller conveyor cross-section. SGC 50 forms an elongated closed duct 54 which extends from receiving section 52. Duct 54 has a generally horizontal section 56 and an inclined portion 58. Horizontal section 56 is primarily provided to adapt the system to existing plant installation space constraints. Closed duct 54 is fully enclosed hydraulically on all sides for some embodiments of operating configurations which will be described. Duct 54 preferably has a generally rectangular cross-section, is water proof, has removal covers at appropriate places with special seals and a double strand drag chain 60 moving inside the duct in an endless manner between sprocket 62 near receiving section 52 and drive sprocket 64 at the terminal end of inclined section 58. A mechanism is provided for adjusting tension in conveyor 60 which may operate at either of sprocket 62 or 64. Drag chain conveyor 60 forms a lower carrying section 66 which moves accumulated ash from receiving section 52 along horizontal section 56 and up inclined section 58, with an upper return section 68 completing the endless chain loop. Inclined section 58 typically extends at an angle of around 30 to 40° which is intended to provide optimized ash dewatering while providing efficiency of ash transport. SGC 50 can be easily installed with existing boilers since the existing hoppers 14 are utilized and only a sluice line is replaced (when replacing a hydraulic transport system). Similarly, the bottom ash gate 16 and clinker grinder 18 normally provided are left in place. Maintaining bottom gate 16 provides maintenance isolation between the boiler and SGC 50 allowing maintenance operations without requiring the associated boiler to be taken off line. Since ash is loaded into the conveyor at a single, approximately square or round point location in receiving section 52 rather than along a long, rectangular shaped opening below the boiler throat, the orientation of the SGC 50 can be rotated 360° in any direction from a plan view. One option is to use a single conveyor arranged in the same manner as a conventional SCC to pick up multiple single loading points. Alternatively multiple smaller conveyors can be used for each single loading point if pre-existing structures occlude a conventional arrangement. This provides great flexibility for space-congested retrofit applications. Another advantage of the point loading configuration is that secondary isolation valves can be installed between the grinder 18 and the conveyor 60 for an additional level of personnel safety when performing conveyor maintenance while the boiler remains operational.

Under certain conditions it may be necessary to limit the feed of ash into the SGC 50 to prevent over-filling. The present invention accomplishes this by monitoring the conveyor drive torque during operation. Torque monitoring can be achieved in several ways, including but not limited to an output of electric motor current or hydraulic pressure. At a pre-determined high set point for the output, simple logic can be used to close an upstream feed valve or stop a preceding conveyor, thereby stopping the feed of additional ash. The conveyor whose drive has reached the high set point can continue to run until sufficiently emptied of ash, as represented by a low set point for the drive output parameter. At this point the signal would then initiate the re-opening of a valve or re-starting of an upstream conveyor to begin feeding ash again. Torque control in this manner also provides benefits for chain size selection and wear life. Because the amount of ash accumulated in the conveyor can be controlled, much smaller chain sizes can be used compared to a conventional SCC in which large masses of ash could pile on top of the chain and flight mechanism. Indeed, the chain size of conventional SCCs is dictated by the amount of ash that could accumulate on top of the chain and flight mechanism rather than the conveying capacity of the machine. Despite the large pile of ash accumulated on the chain in a conventional SCC, the removal rate remains constant based on the dimensions of the flight bars. Therefore, a SGC 50 as described in the present invention can provide an equivalent conveying capacity to a conventional SCC with a given flight bar size while using smaller chain. The use of smaller chain provides considerable cost savings. Additionally, chain wear life is prolonged by lower link-to-link stresses realized by reduced ash loading.

The basic system described for SGC 50 can be operated in various configurations, each providing certain features for optimization for a particular plant application. Also, the duct widths, the flight design and the flight distances and the chain speed are flexible and can be adapted to the requirements.

Figure 6:
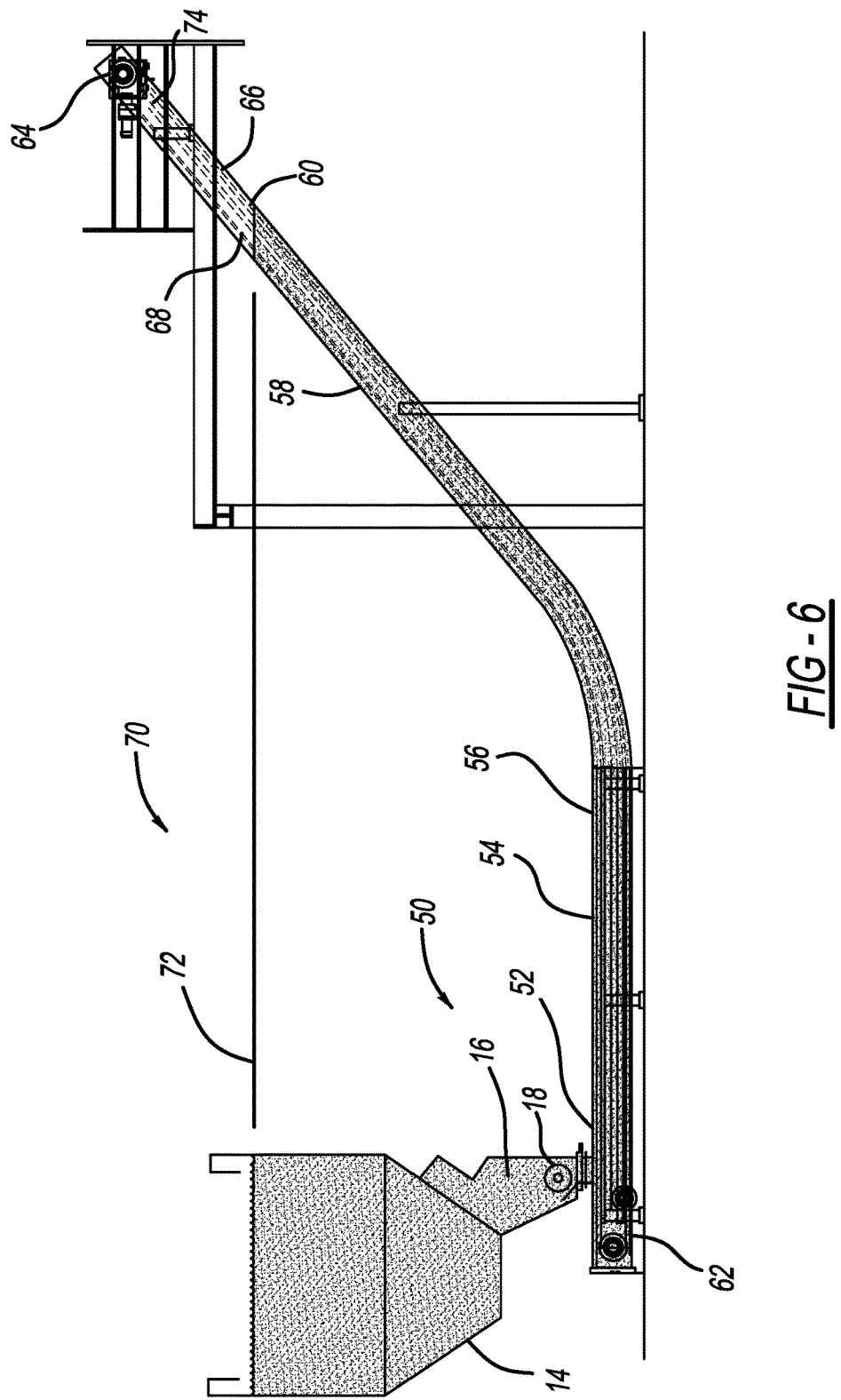
FIG. 6 illustrates an embodiment of SGC illustrated in FIG. 5 operated in a continuous high water level configuration.

Such configurations are next described with reference to FIGS. 6-9. FIG. 6 illustrates an operational approach referred to as "continuous high water level" system 70. In this configuration, a high water level is maintained in the ash hopper 14 which is normally filled with water and also in the SGC 50. Dark shading in FIG. 6 indicates the presence of water and its level. FIG. 6 illustrates the normal water column height maintained in system 70. As shown, ash hopper bottom gate 16 is normally open resulting in a water column height designated by horizontal line 72 in both the hopper 14 and in SGC 50. A portion of inclined section 58 extends above water column height 72, designated as section 74, and over that inclined distance dewatering of the collected ash particles occurs. It is noted that since system 70 is typically intended to operate continuously there is a relatively small mass flow rate of ash falling into SGC 50 (as compared with batch type operation). Accordingly, as compared with batch type systems, conveyor 60 runs at a relatively slow rate. This slow rate of advancement of the drag chain conveyor 60 provides more residence time of ash particles in the dry inclined section 74, enhancing dewatering.

The water level height 72 of system 70 may be in the range similar to that for conventional wet sluicing systems; namely, around 15-25 feet above grade. In operation, SGC 50 operated in accordance with configuration 70 runs continuously with bottom gate 16 normally open, thus water level 72 will not change. It is likely that flushing nozzles (not shown) may be needed within the inclined internal surfaces of hopper 14 to clear away accumulated ash solids.

SGC 50 operated in accordance with configuration 70 provides significant advantages over prior art systems. It is highly adaptable to existing plant configurations, avoids the necessity of high volumes of transport water, and can be installed with a comparatively low capital expenditure and operated at expected low maintenance cost.

Figure 6A:
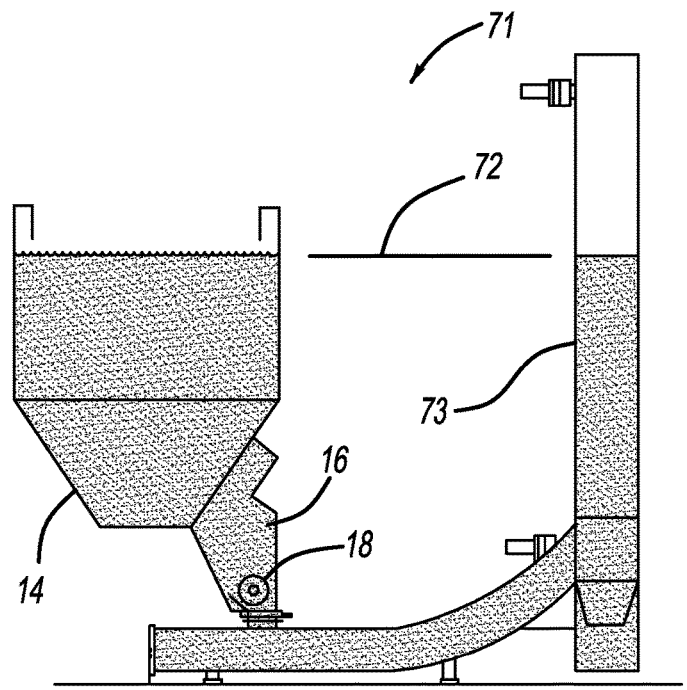
FIGS. 6A and 6B illustrate a variation of the SGC embodiment illustrated in FIG. 6.
Figure 6B:
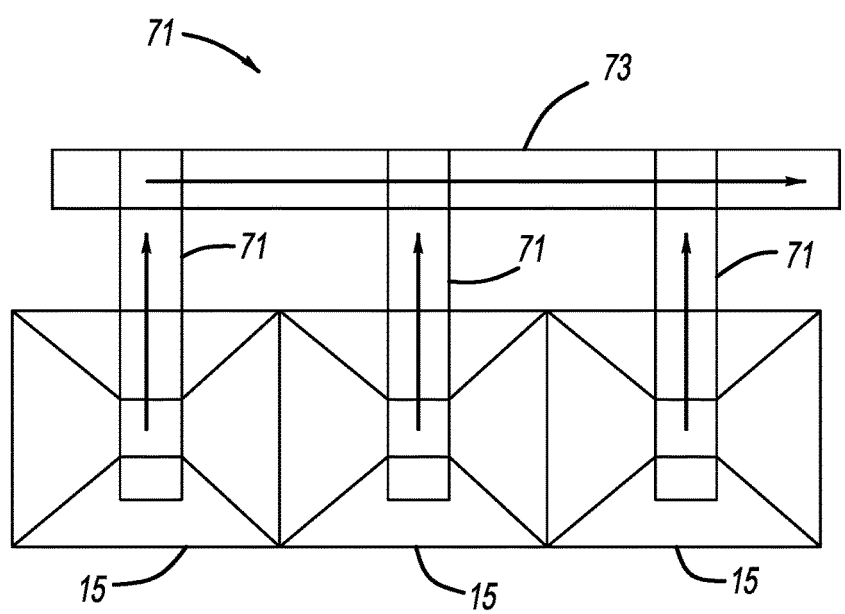

A variation of "continuous high water level" system 70 shown in FIG. 6 is shown in FIGS. 6A and 6B. These figures illustrate that hopper 14 may be configured to have multiple separate pantlegs 15. In this representation a small SGC 71 can be provided for each of pantlegs 15 and can be configured to be completely submerged, including in the discharge section. A second SCC 73 is then used to transport the ash above the water level, in this case oriented to transport the ash in a direction 90° from the first SGCs 71. This configuration provides further flexibility to arrange the conveyors to reach a clear space in a congested area.

Figure 7:
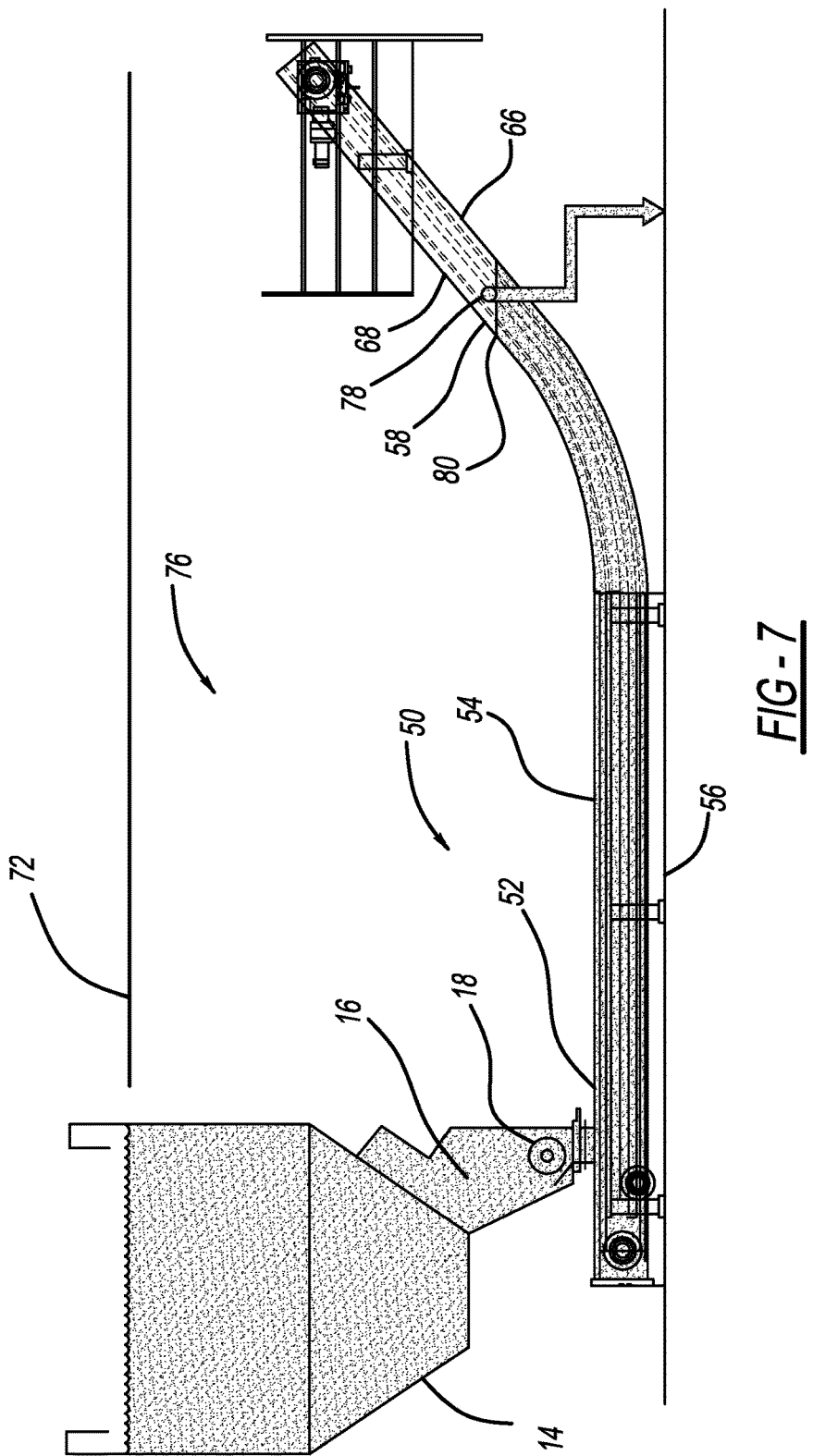
FIG. 7 illustrates an embodiment of SGC illustrated in FIG. 5 operated in a high water level with drain configuration.

Now with reference to FIG. 7, a second operational configuration of SGC 50 is shown, referred to as "high water level with drain configuration" 76. Configuration 76 differs from configuration 70 previously described in that it is operated in a batch process mode and thus ash hopper bottom gate 16 only opens during an ash pull cycle. Hopper 14 is normally maintained with a high water height 72. When bottom gate 16 opens, water and ash drains from the hopper 14 into SGC 50 into an overflow box 78 which could be placed anywhere along the length of the SGC 50. Overflow water can be moved to an adjacent tank or sump (not shown) for temporary storage until the ash pull cycle is complete. Ash is removed from the full hopper for 1-2 hours, for example. It is likely that hopper wall flushing nozzles will be needed which would run at the end of a pull cycle to clear accumulated ash solids adhering to the walls of the hopper. At the end of the flush, the bottom gate 16 is again closed and hopper 14 begins to accumulate ash until the next pull cycle occurs which may take place, for example 8-12 hours later.

As shown in FIG. 7, the water level maintained in SGC designated as level 80 is much lower than hopper water level 72. This provides a lower height inclined section 58 provided for dewatering of the ash. This can result in a more compact SGC 50 installation for particular applications.

Figure 8:
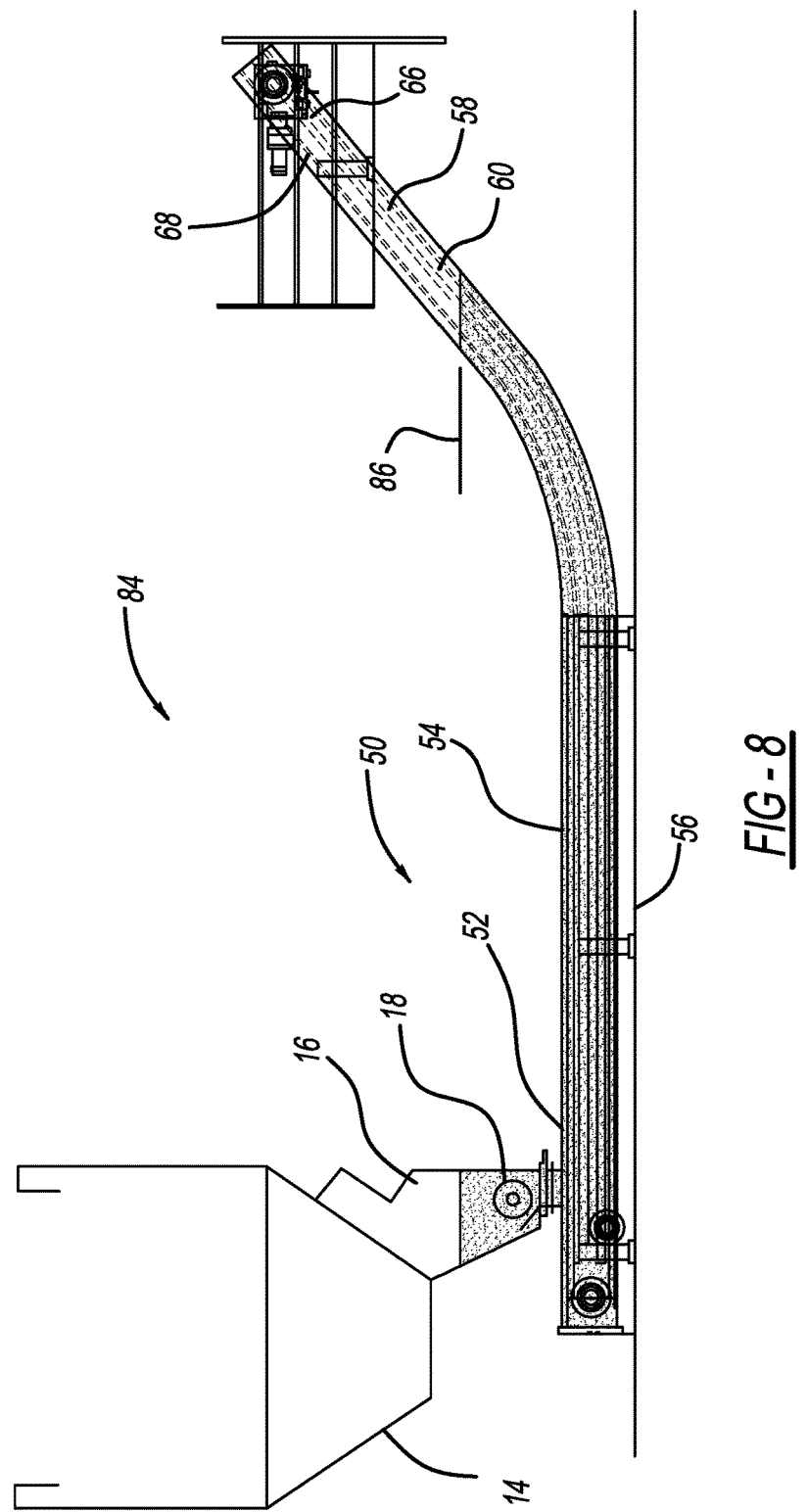
FIG. 8 illustrates an embodiment of SGC illustrated in FIG. 5 operated in a dry ash hopper and low water level in SGC configuration.

Now with reference to FIG. 8, another configuration for operating SGC 50 is illustrated, referred to as a "dry ash hopper and low water level in SGC" configuration 84. In this application, ash hopper 14 is dry and the water level 86 within the hopper and SGC 50 is maintained just above clinker grinder 18, which provides cooling for the grinder. In this system, water level 86 is a lower than prior embodiments. Operation of system 84 is typically continuous in that ash hopper bottom gate 16 remains open continuously and ash falls into grinder 18 as it is produced. Air cannons, water sprays or other systems (not illustrated) may be employed to clear the walls of hopper 14 of accumulated ash. Configuration 84 provides a relatively small volume of water in SGC 50 which may require auxiliary cooling systems. The low water height maintained in system 84 permitting a short run of inclined section 58 further provides opportunities for installation in very tight installation space allotments.

Figure 9:
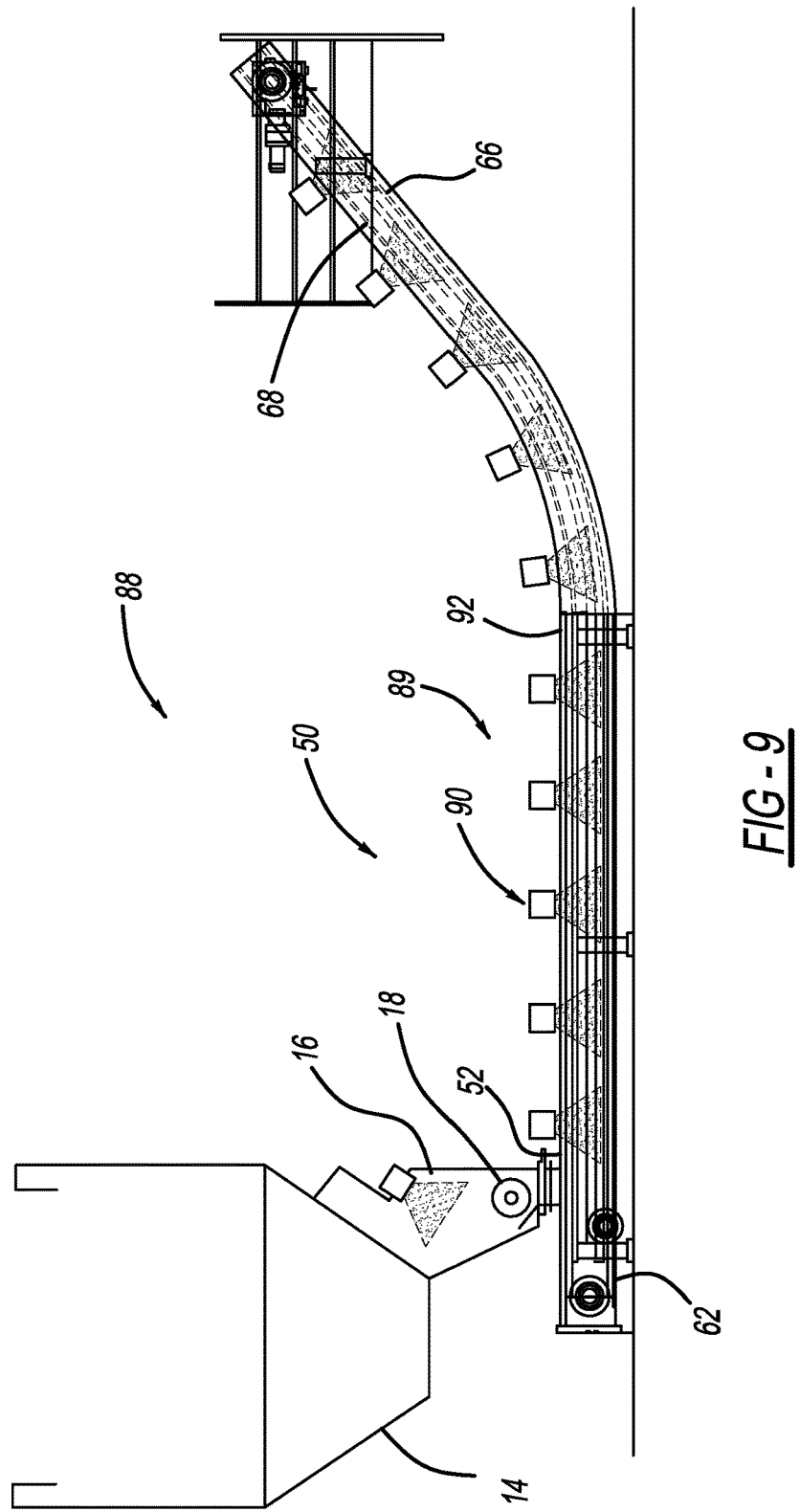
FIG. 9 illustrates an embodiment of SGC illustrated in FIG. 5 operated in a dry ash hopper and water spray configuration.

Now with reference to FIG. 9, another configuration for operating SGC 50 is illustrated, referred to as a "dry ash hopper and water spray" configuration 88. This configuration is essentially a dry system in that the ash is not submerged in water. However, the requirement of cooling the ash remains. For this purpose a series of water sprays 90 is provided. Operation here would typically be continuous with bottom gate 16 open with SGC 50 operated continuously. Here it should be noted that conveyor unit 60 does not provide a submerged drag chain and therefore this configuration is better described as a dry chain conveyor or DCC since the ash is no longer submerged.

The several embodiments of the present invention permit a large volume of ash to be stored within the existing separate ash storage hoppers 14, which allows lower-cost type conveyors to be used. Conventional SCC's can allow large ash piles to accumulate above the conveyor mechanism. Accordingly, the chain and drive system must be designed to accommodate removal of such a large ash pile which normally requires a large chain and drive size. With the SGCs 50 of the present invention, the existing ash hopper 14 contains the ash pile if prolonged storage is needed. The conveyor 50 itself has a small volume in which ash can be stored, so the design condition for worst-case ash loading is much smaller, allowing the use of smaller chain and drive size.

Figure 10:
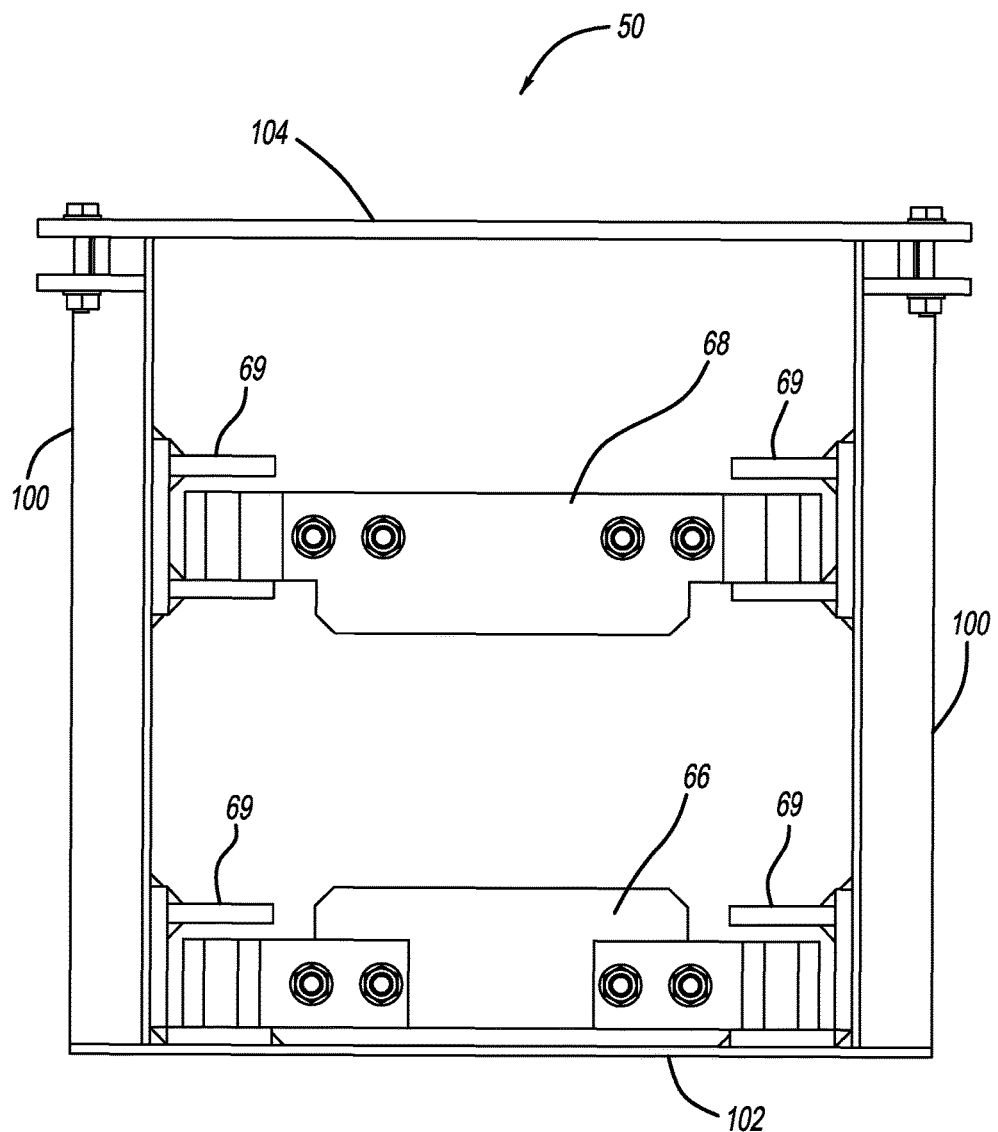
FIG. 10 illustrates a bottom carry arrangement of SGC.

In preferred embodiments of SGC 50 of the present invention a "bottom carry" configuration can be used. In part this is enabled since the use of clinker grinder 18 reduces the size of ash particles. FIG. 10 illustrates the bottom carry arrangement in which the chains flights 66 and 68 are directly supported by the chains. The double strand chains are guided in replaceable wear bars and are guided by "U" channels 69. A bottom carry arrangement is an improvement because all the runs of the chain are contained and the submerged water bath is positioned to clean the return run of chain and deposit ash into the bottom run by gravity. FIG. 10 further illustrates in the cross-section of SGC that it provides a hydraulically closed vessel having sidewalls 100, bottom plate 102 and upper lid 104. Additionally, a bottom carry conveyor can be configured with a fully submerged chain tension arrangement, thereby eliminating the need for a tall vertical tower for chain tensioning where the dry return run of chain must elevate above the water level to re-enter the submerged portion of the conveyor. In this way, a bottom carry conveyor can be configured to operate such that its internals are completely submerged as indicated by conveyor 71 in FIGS. 6A and 6B.

While the above description constitutes the preferred embodiment of the present invention, it will be appreciated that the invention is susceptible to modification, variation and change without departing from the proper scope and fair meaning of the accompanying claims.

The invention claimed is:

1. A submerged grind conveyor system for removing bottom ash from a large-scale coal fired combustion device, the conveyor system comprising, a bottom hopper for collecting the bottom ash with a bottom gate for controlling the flow of the ash from the hopper and a grinder to reduce the size of large ash particles; and a submerged chain conveyor unit having a chain conveyor housing that is separate from the bottom hopper, an elongated closed duct with a receiving section positioned for receiving the ash from the bottom gate and an inclined section for elevating the ash, and having an internal continuous drag chain conveying unit for transporting the ash from the hopper to the inclined section where the accumulated ash is dewatered for discharge from the system, the enclosed duct and the chain conveyor housing enclosing the drag chain of the submerged chain conveying unit having a bottom section conveying the ash from the hopper to discharge from the system and a return top section, the top and bottom sections moving in opposite directions with one of the top or bottom sections moving the ash particles from the receiving section to the inclined section and for the discharge.

2. The submerged grind conveyor system in accordance with claim 1 in which the drag chain conveying unit is loaded from a single point input from the bottom hopper allowing the conveyor system to be rotated in any of 360° directions in plan relative to the bottom hopper.

3. The submerged grind conveyor system in accordance with claim 1 in which the conveyor unit is loaded from multiple points from the same hopper.

4. A submerged grind conveyor system in accordance with claim 1 further comprising;

a plurality of water spray nozzles positioned along the chain Conveying unit for discharging cooling water onto the ash transported by the conveying unit, and the system configured for continuous collection of bottom ash discharged from the hopper onto the receiving section of the chain conveyor unit.

5. A submerged grind conveyor system for removing bottom ash from a large-scale coal fired combustion device having a bottom hopper for collecting the bottom ash with a bottom gate for controlling the flow of the ash from the hopper and a grinder to reduce the size of large ash particles, comprising;

a submerged chain conveyor unit having a chain conveyor housing that is separate from the bottom hopper, an elongated closed duct with a receiving section positioned for receiving ash from the bottom gate and an inclined section for elevating the ash, and having an internal continuous drag chain conveying unit for transporting the ash from the hopper to the inclined section where the accumulated ash is dewatered for discharge from the system, wherein the feed of the ash into the chain conveyor unit is controlled by a conveyor drive unit through a signal relating to a drive torque output.

6. The submerged grind conveyor system in accordance with claim 5 further comprising, a valve positioned between the grinder and the submerged chain conveyor unit in which the valve is controlled by the signal from the conveyor drive unit to accomplish control of the feed of the ash into the chain conveyor unit.

7. A submerged grind conveyor system for removing bottom ash from a large-scale coal fired combustion device having a bottom hopper for collecting the bottom ash with a bottom gate for controlling the flow of the ash from the hopper and a grinder to reduce the size of large ash particles, comprising;

a submerged chain conveyor unit having a chain conveyor housing that is separate from the bottom hopper, an elongated closed duct with a receiving section positioned for receiving ash from the bottom gate and an inclined section for elevating the ash, and having an internal continuous drag chain conveying unit for transporting the ash from the hopper to the inclined section where the accumulated ash is dewatered for discharge from the system in which the conveyor units loaded from multiple points from the same hopper and in which the feed of the ash into the chain conveyor unit is controlled by a conveyor drive unit through a signal relating to a drive torque output of the drive unit.

8. The submerged grind conveyor system in accordance with claim 7 further comprising; a valve positioned between a grinder feed point and the submerged chain conveyor unit in which the valve is controlled by the signal from the conveyor drive unit to accomplish control of the feed of the ash into the chain conveyor unit.

9. A submerged grind conveyor system for removing bottom ash from a large-scale coal fired combustion device having a bottom hopper for collecting the bottom ash with a bottom gate for controlling the flow of the ash from the hopper and a grinder to reduce the size of large ash particles, comprising;

a submerged chain conveyor unit having a Chain conveyor housing that is separate from the bottom hopper, an elongated closed duct with a receiving section positioned for receiving ash from the bottom gate and an inclined section for elevating the ash, and having an internal continuous drag chain conveying unit for transporting the ash from the hopper to the inclined section where the accumulated ash is dewatered for discharge from the system, the system configured for operation with maintaining a water column in the submerged chain conveyor unit at a second water level less than a first water level within the hopper, the system configured to operate in a batch process in which the bottom gate of the hopper is periodically opened to discharge accumulated water and ash from the hopper into the submerged chain conveyor unit with the bottom gate periodically closed to isolate the hopper from the submerged chain conveyor unit while the hopper collects the bottom ash over time.

10. A submerged grind conveyor system for removing bottom ash from a large-scale coal fired combustion device having a bottom hopper for collecting the bottom ash with a bottom gate for controlling the flow of the ash from the hopper and a grinder to reduce the size of large ash particles, comprising;

a submerged chain conveyor unit having a chain conveyor housing that is separate from the bottom hopper, an elongated closed duct with a receiving section positioned for receiving ash from the bottom gate and an inclined section for elevating the ash, and having an internal continuous drag chain conveying unit for transporting the ash from the hopper to the inclined section where the accumulated ash is dewatered for discharge from the system the system configured for operation with the hopper in the form of a dry hopper with a water column maintained within the submerged chain conveyor unit with the system operating continuously or in batch mode to receive the bottom ash which falls into the submerged chain conveyor unit.

11. A submerged grind conveyor System for removing bottom ash from a large-scale coal fired combustion device having a bottom hopper for collecting the bottom ash with a bottom gate for controlling the flow of the ash from the hopper and a grinder to reduce the size of large ash particles, comprising:

a submerged chain conveyor unit having a chain conveyor housing that is separate from the bottom hopper, an elongated closed duct with a receiving section positioned for receiving the ash from the bottom gate and an inclined section for elevating the ash, and having an internal continuous drag chain conveying unit for transporting the ash from the hopper to the inclined section where the accumulated ash is dewatered for discharge from the system, the system configured for operation with maintaining a water column in the closed duct having a water column height within the hopper and in the conveyor unit at a generally equal level wherein water fills a portion of the inclined section and an extending dry portion of the inclined section providing dewatering of the ash transported by the drag chain conveying unit, the conveyor system configured for continuous or batch operation and collection of the ash from the hopper, the hopper and the submerged chain conveyor housing hydraulically connected.

12. A submerged grind conveyor system for removing bottom ash from a large-scale coal fired combustion device having a bottom hopper for collecting the bottom ash with a bottom gate for controlling the flow of the ash from the hopper and a grinder to reduce the size of large ash particles, comprising;

a submerged chain conveyor unit having a chain conveyor housing that is separate from the bottom hopper, an elongated closed duct with a receiving section positioned for receiving ash from the bottom gate and an inclined section for elevating the ash, and having an internal continuous drag chain conveying unit for transporting the ash from the hopper to the inclined section where the accumulated ash is dewatered for discharge from the system, the submerged chair conveyor unit in the form of a first submerged chain conveyor unit receiving the ash from the bottom gate and a second submerged chain conveyor unit receiving the ash from the first submerged conveyor unit and including the inclined section, each of the first and the second submerged chain conveyor units having respective first and second drag chain conveying units.

13. The submerged grind conveyor system in accordance with claim 12 in which the feed of the ash into the plurality of chain conveyor units is controlled by a conveyor drive units through a signal relating to a drive torque output of the drive unit.

14. A submerged grind conveyor system for removing bottom ash from a large-scale coal fired combustion device having a bottom hopper for collecting the bottom ash with a bottom gate for controlling the flow of the ash from the hopper and a grinder to reduce the size of large ash particles, comprising;

a submerged chain conveyor unit having a chain conveyor housing that is separate from the bottom hopper, an elongated closed duct with a receiving section positioned for receiving the ash from the bottom gate and an inclined section for elevating the ash, and having an internal continuous drag chain conveying unit for transporting the ash from the hopper to the inclined section where the accumulated ash is dewatered for discharge from the system, a plurality of the submerged chain conveyor units, including a first and a second submerged chain conveyor unit, each of the first and second, submerged chain conveyor units are filled with water with each having a receiving section positioned for receiving ash from the bottom gate or a preceding submerged chain conveyor unit, the second chain conveyor receiving ash from the first submerged chain conveyor and having an inclined section for elevating the ash, and having an internal continuous chain conveying unit for transporting the ash from the hopper to the inclined section where the accumulated ash is dewatered for discharge from the system.

15. The submerged grind conveyor system in accordance with claim 14 further comprising; a valve positioned between the grinder and the first submerged chain conveyor unit in which the valve is controlled by a signal from a conveyor drive unite to accomplish control of the feed of ash into the submerged grind conveyor system.

\* \* \* \* \*